UNITED STATES PATENT OFFICE.

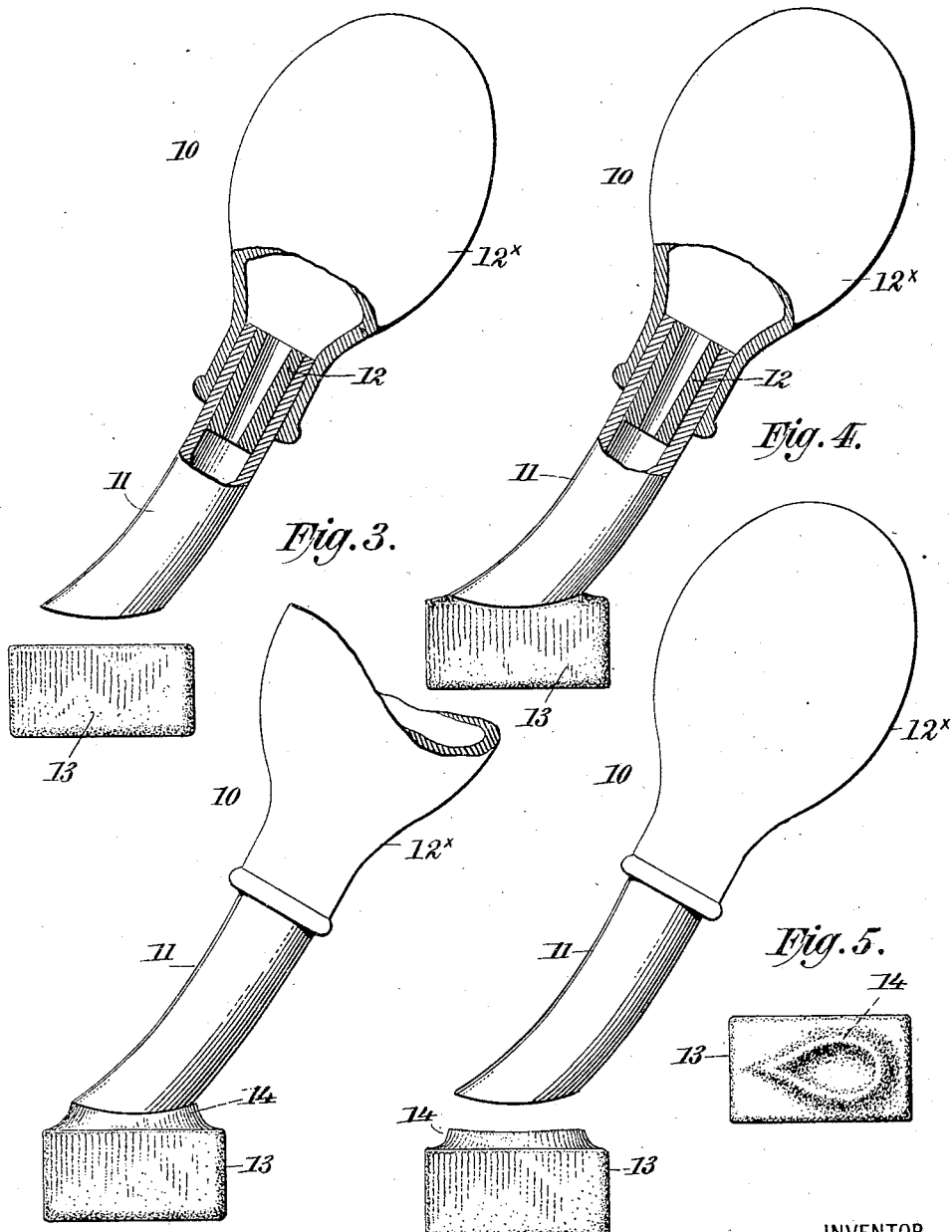

HENRY E. SHORT, OF NEW YORK, N. Y., ASSIGNOR, BY MESNE ASSIGNMENTS, TO EUREKA MANUFACTURING COMPANY, OF BOSTON, MASSACHUSETTS, A CORPORATION OF MASSACHUSETTS.

METHOD OF ORNAMENTING CANDY.

No. 859,125.  Specification of Letters Patent.  Patented July 2, 1907.

Application filed December 27, 1906. Serial No. 349,645.

*To all whom it may concern:*

Be it known that I, HENRY E. SHORT, a citizen of the United States, residing at the city of New York, borough of Manhattan, in the county and State of New York, have invented certain new and useful Improvements in Methods of Ornamenting Candy, of which the following is a full, clear, and exact specification.

My invention relates to improvements in methods of ornamenting or decorating candy, confectionery and analogous substances, and the same has for its object more particularly to provide a simple, efficient and reliable method of ornamenting or decorating candy or other substances coated with chocolate, icing or analogous material.

To the attainment of the aforesaid objects and ends my invention consists in the novel method of treating the candy or other substances to be ornamented, as hereinafter more fully described and then pointed out in the claims.

In the accompanying drawings forming part of this specification, wherein like numerals of reference indicate like parts, I have graphically shown the successive steps constituting the method embodying my invention, and also one form of an apparatus for carrying said invention into effect; the detailed construction of which apparatus is fully set forth in another application filed by me in the United States Patent Office on December 5th, 1906, Serial No. 346,375, and in said drawings Figure 1 is a side view of a piece of coated candy, and an ornamenting apparatus, the latter being also shown in side view, partly broken, and in position above the candy; Fig. 2 is a similar view showing the nozzle of the ornamenting apparatus in contact with the piece of candy; Fig. 3 is a similar view, partly broken, showing the nozzle of the ornamenting apparatus partly raised and the coating of the candy adhering thereto; Fig. 4 is a view similar to Fig. 1 showing the nozzle freed from the piece of candy, and the finished ornament produced upon the latter, and Fig. 5 is a top view of a piece of candy ornamented according to my method.

In the accompanying drawings the apparatus 10 is shown as consisting of a curved, flexible nozzle 11, formed preferably of rubber, and tubular in shape. The lower edge of said nozzle 11 is preferably slightly curved, as shown, and shaped to the particular or distinctive form of design desired; in this instance being shown as pear-shaped.

Within the upper end of the nozzle 11 is secured a re-inforcing sleeve 12, and upon the outer side of this re-inforced portion of said nozzle 11 is secured the open lower end of a compressible bulb 12× made of rubber or other suitable materials and which also serves as a handle for said nozzle 11.

In carrying out my method of ornamenting, as for example, chocolate coated candy, the candy with its coating, while still soft and ductile, is placed upon a suitable tray or support, and the apparatus 10 grasped by its bulb 12× by operator. The lower curved edge of the nozzle 11 is held in position above the freshly coated candy 13, as illustrated at Fig. 1, and then is gently lowered until the lower edge of said nozzle is brought into complete contact with the coating on the upper surface of the candy, 13 as shown in Fig. 2. The apparatus is thereupon raised without altering its position, and with the coating adhering to the edge of the nozzle drawn up a short distance, as shown at Fig. 3, to produce the raised ornament 14. As soon as the coating has been drawn up to the desired point or height, the engagement of the curved end of the nozzle with the coating is broken by a short compression of the bulb 12×, whereupon the raised ornament 14 will recede or settle slightly upon the piece of candy and in cooling and hardening assume the shape shown in side view at Fig. 4, and in top view at Fig. 5. By compressing the bulb 12× slightly and then allowing the same to expand as soon as the lower end of the nozzle 11 is fully in contact with the coating, the design may be drawn slightly together prior to the final compression of the bulb 12× whereby the connection between the coating and the end of the nozzle 11 is broken. Further other variations may be readily made in any particular design by the operator in manipulating the pressure within the apparatus in the operation of ornamenting the candy.

Further it will be understood that the shape of the design may be varied by employing nozzles of different shapes or designs without affecting the character of the operation of ornamenting, and that the invention is equally applicable to other substances than chocolate, *e. g.* candy coatings of all kinds, icings, and analogous substances.

Having thus described my said invention, what I claim and desire to secure by Letters Patent is:

1. The method of ornamenting candy and analogous substances, having a coating thereon, which consists in subjecting the same to contact with an ornamenting device; raising said ornamenting device to draw up said coating, and then releasing said ornamenting device from said coating by pressure within said ornamenting device, substantially as specified.

2. The method of ornamenting candy and analogous substances having a coating thereon, which consists in subjecting the same to contact with an ornamenting device adapted to adhere to said coating; raising said ornamenting device and the coating adhering thereto, and then releasing said ornamenting device from said coating by pressure produced within said ornamenting device, substantially as specified.

3. The method of ornamenting candy and analogous substances having a coating thereon, which consists in subjecting the same to contact with an ornamenting device having a nozzle adapted to adhere to said coating; raising said ornamenting device with the coating adhering to said nozzle, and then releasing said nozzle from said coating by air pressure produced within said ornamenting device, substantially as specified.

4. The method of ornamenting candy and analogous substances having a coating thereon, which consists in subjecting the same, while soft, to contact with an ornamenting device comprising a compressible member and a nozzle of distinctive shape adapted to adhere to said coating; raising said ornamenting device with the coating adhering to said nozzle, and then releasing said nozzle from said coating by compression of said compressible member, substantially as specified.

5. The method of ornamenting candy and analogous substances having a coating thereon, which consists in subjecting the same, while soft, to contact with an ornamenting device comprising a compressible bulb and a resilient nozzle secured thereto having a discharge end of distinctive shape adapted to adhere to said coating; raising said ornamenting device with the coating adhering to said nozzle, and then releasing said nozzle from said coating while in its raised position by pressure applied to said bulb, substantially as specified.

Signed at the city of New York, in the county and State of New York, this 26th day of December, 1906.

HENRY E. SHORT.

Witnesses:
 EARLE H. HOUGHTALING,
 FLORENCE BALCROFT.